(No Model.)
J. DAVIS.
Apparatus for Tanning.
No. 234,659. Patented Nov. 23, 1880.
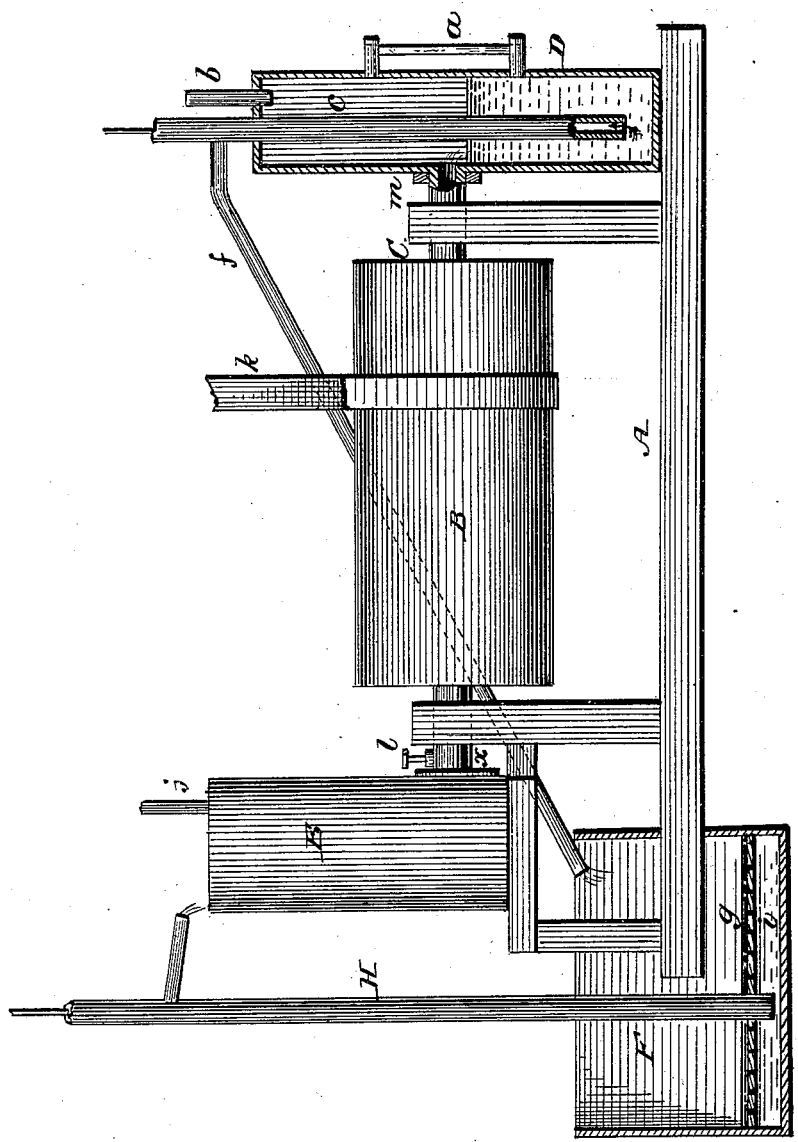
Witnesses
Fred. G. Dieterich
A. W. Krause
Inventor
John Davis
by J. J. Johnston
Atty
N. PETERS, PHOTO-LITHOGRAPHER, WASHINGTON, D. C.

UNITED STATES PATENT OFFICE.

JOHN DAVIS, OF ALLEGHENY, PENNSYLVANIA.

APPARATUS FOR TANNING.

SPECIFICATION forming part of Letters Patent No. 234,659, dated November 23, 1880.

Application filed August 24, 1880. (No model.)

*To all whom it may concern:*

Be it known that I, JOHN DAVIS, of Allegheny, in the county of Allegheny and State of Pennsylvania, have invented a certain new and useful Improvement in Apparatus for Tanning Skins; and I do hereby declare that the following is a full, clear, and exact description thereof, reference being had to the accompanying drawing, and to the letters of reference marked thereon.

My invention relates to an improvement in apparatus for tanning the skins of animals whereby the skins may be subjected to continuous agitation in a revolving vat, through which is a continuous flow of tanning-liquor, which is gradually increasing in strength from the commencement to the close of the tanning process, with or without the air exhausted from said revolving vat, as will hereinafter more fully appear.

To enable others skilled in the art with which my invention is most nearly connected to make and use it, I will proceed to describe its construction and operation.

In the accompanying drawing, A represents the frame-work of the apparatus, on which is mounted in suitable bearings a vat, B, having hollow trunnions C, which communicate with vessels D E, the former vessel being air-tight, and provided with a glass indicator, $a$, for showing the amount of liquor in said vessel. To the pipe $b$ of said vessel is attached an air-pump.

The vessel D is provided with a pump, $c$, to which is connected a pipe, $f$, which communicates with a leaching-vat, F, furnished with a perforated bottom, $g$.

A pump, H, is connected with the liquor-chamber $i$ of the vat F for pumping the liquor from said chamber into the tempering-vat E, which is provided with a steam-pipe, $j$, either straight or coiled, which extends to near the bottom of the tempering-vessel E, through which a current of steam is allowed to flow.

The vat B is revolved through the medium of a belt, $k$, which passes around the vat and over a suitable driving-pulley. The pipe $x$, which communicates with the vessel E and one of the trunnions of the vat, is provided with a valve, $l$.

The construction of the several parts of the apparatus hereinbefore described will readily be understood from the foregoing description, and by reference to the accompanying drawing.

Ground tan-bark is placed in the leaching-vat F, and supplied with the necessary amount of water. The liquor, as it flows into chamber $i$ of said vat, is, by the pump H, pumped into the vessel E, where it is heated to about a blood-heat. The hides, being prepared for the tanning process in the usual manner and by the ordinary means, are suspended in the vat B, which is then sealed. The operator then opens the valve $l$ and allows the liquor in the vessel E to flow through pipe $x$ into the vat B until the vat is about half filled. The vat is then revolved, and the liquor, as it flows through the trunnion of the vat and the pipe $m$ into the vessel D, is pumped from said vessel through the medium of the pump $c$, from which it flows through pipe $f$ back into the leaching-vat; and thus the operation continues, the tanning-liquor constantly flowing through the vat B into vessel D, from which it is pumped and flows into the leaching-vat F, from which it is pumped into the vessel E, and from it back into the vat B, during which process the air may from time to time be exhausted from the vessel D and vat B; or, if desired, the air-pump may be continuously and slowly worked; or, if desired, the working of the air-pump may be dispensed with and air admitted into the vat B, so that the process may be carried on with or without the air being exhausted from the vat B.

It being a well-ascertained fact that a given number of hides of a given weight require a given amount of tannin for tanning them, and it being also a well-known fact that a given quantity of bark will give by the leaching process a given quantity of tannin and tanning-liquor, therefore it is advisable that the leaching-vat should be sufficiently large to contain the necessary amount of bark for tanning the charge of skins placed in the vat B. By so doing it will readily be observed that the liquor flowing constantly through the vat B, and being pumped back onto the tan-bark, it will, in its passage through the bark, gradually increase in strength until the tannin is entirely extracted from the bark. Hence the skins placed in the vat B will be constantly subjected to liquor gradually increasing in strength from the beginning to the ending of the tanning process, and at the same time will be thoroughly agitated in said liquor by the revolving of the vat and the flowing of the liquor through it, thereby subjecting the hides to counter-currents of said liquor.

Having thus described my improvement, what I claim is—

In the apparatus hereinbefore described, the leaching-vat F, tanning-vat B, vessels D E, and pumps c H, constructed, arranged, and adapted to operate with relation to each other substantially as and for the purpose set forth.

JOHN DAVIS.

Witnesses:
A. C. JOHNSTON,
JAMES J. JOHNSTON.